(No Model.)
M. TUQUET, M. BOUDARD & C. H. CRAWLEY.
DRIVING BELT FASTENER.
No. 436,678. Patented Sept. 16, 1890.
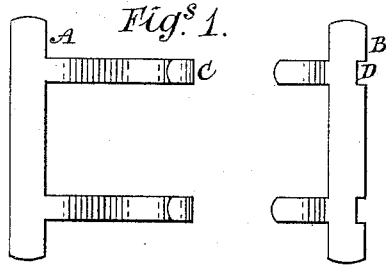
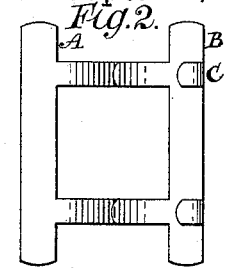
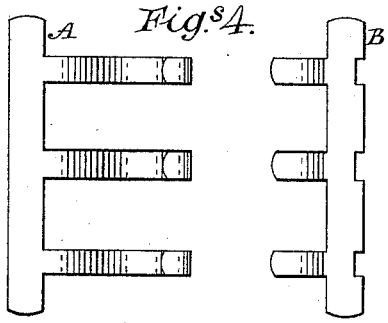
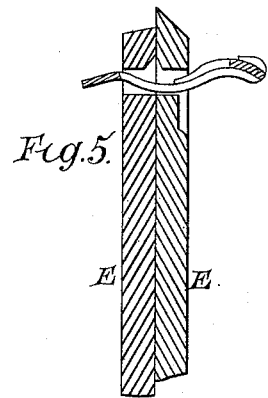
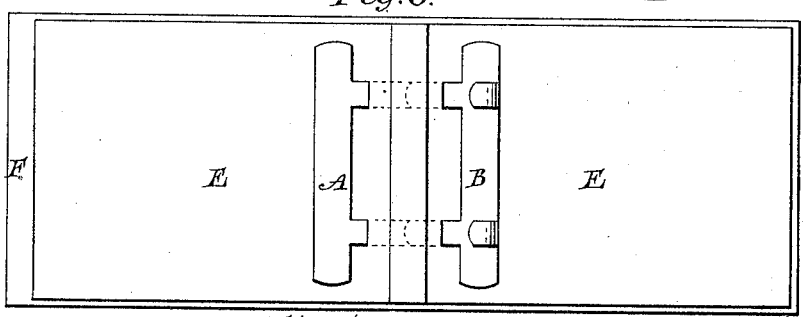
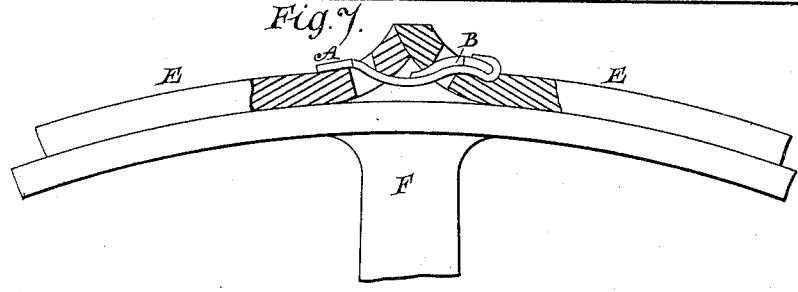
Witnesses:
Inventors
Marcel Tuquet
Marcel Boudard
Cornelius Henry Crawley

UNITED STATES PATENT OFFICE.

MARCEL TUQUET, MARCEL BOUDARD, AND CORNELIUS HENRY CRAWLEY, OF NOTTINGHAM, ENGLAND.

DRIVING-BELT FASTENER.

SPECIFICATION forming part of Letters Patent No. 436,678, dated September 16, 1890.

Application filed June 17, 1890. Serial No. 355,781. (No model.)

*To all whom it may concern:*

Be it known that we, MARCEL TUQUET and MARCEL BOUDARD, lace designers, and CORNELIUS HENRY CRAWLEY, machinist, subjects of the Queen of Great Britain, and all residents of Nottingham, England, have invented new and useful Improvements in Fasteners for Connecting the Ends of Driving-Belts, of which the following is a specification, reference being had to the accompanying drawings.

In the drawings, Figure 1 shows in plan a pair of two-armed bars separated; Fig. 2, a plan of the two bars placed together, and Fig. 3, an end view of the same. Fig. 4 shows in plan a pair of three-armed bars separated. Fig. 5 shows in section two ends of a belt or belts placed together to enable a fastener or fasteners to be inserted; Fig. 6, a plan of two ends of a belt connected by a fastener when at work on a pulley, and Fig. 7 an edge view of the same with portions of the belt shown in section.

Each fastener consists of a pair of flat bars A and B. From the front edge of the bar A two or more arms project, the ends of which are turned upward to form hooks C. The front edge of the bar B has recesses D formed in it of sufficient depth and width to receive the hooked ends of the arms of the bar A. From the back edge of the bar B two or more short arms project, which when in use lie upon the front hooked ends of the arms projecting from the bar A, as shown at Figs. 6 and 7. The ends E of the belt or belts to be connected have holes formed in them, as shown at Figs. 5 and 7, through which the arms projecting from the bar A are passed while the ends of the belt are held flat and close together, as shown at Fig. 5. Then the arms of the bar B are passed into the holes of one end of the belt and the recesses are made to engage with the hooks of the bar A. The belt is then opened out and placed upon the pulley F.

The two bars when the belt is in use bear upon the outer sides of the ends of the belt and hold it securely connected.

The breadth, thickness, and length of the arms of the two bars will depend upon the width and thickness of the ends of the belt or belts to be connected. When wide belts are to be connected, two or more pairs of bars A and B are employed in preference to a long pair of bars.

When necessary, the ends of the belt may be readily disconnected by closing the ends together and removing the bar B. The arms of the bar A may then be drawn out of the holes in the belt.

What we claim is—

A belt-fastener consisting of the bar A, having projecting arms formed into hooks C, and the bar B, having edge recesses D, with which the said hooks engage, and provided with arms which overlie the hooked arms of the other bar, substantially as and for the purpose described.

In testimony whereof we have hereunto signed our names in the presence of two subscribing witnesses.

MARCEL TUQUET.
MARCEL BOUDARD.
CORNELIUS HENRY CRAWLEY.

Witnesses:
H. W. GOUGH,
JNO. H. GOUGH.